(12) United States Patent
Yamaguchi et al.

(10) Patent No.: US 6,507,340 B1
(45) Date of Patent: Jan. 14, 2003

(54) METHOD OF DISPLAYING THREE-DIMENSIONAL OBJECT TO MAKE A PART OF A HOLLOW SHELL TRANSPARENT

(75) Inventors: Hiroshi Yamaguchi, Tokyo; Hiroshi Maruyama, Fukuoka, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/572,962

(22) Filed: May 18, 2000

(30) Foreign Application Priority Data

May 19, 1999 (JP) .......................................... 11-139281

(51) Int. Cl.$^7$ .............................................. G06F 15/00
(52) U.S. Cl. ...................................................... 345/421
(58) Field of Search ................................ 345/419, 420, 345/421, 422, 619, 620

(56) References Cited

U.S. PATENT DOCUMENTS

| 5,157,546 A | 10/1992 | Williams et al. ............. 359/462 |
| 6,384,821 B1 * | 5/2002 | Borrel et al. ................ 345/421 |
| 6,396,509 B1 * | 5/2002 | Cheng ......................... 345/419 |

* cited by examiner

*Primary Examiner*—Phu K. Nguyen
(74) *Attorney, Agent, or Firm*—Foley & Lardner

(57) ABSTRACT

In a method of displaying a three-dimensional object for use in a computer aided design (CAD), the method comprises the steps of extracting, as an extracted shell part, a part of the hollow shell that is opposed to an observing point which lies in the outside of the three-dimensional object and of displaying the three-dimensional object so as to see the inside of the three-dimensional object through the extracted shell part.

7 Claims, 6 Drawing Sheets

METHOD OF DISPLAYING THREE-DIMENSIONAL OBJECT TO MAKE A PART OF A HOLLOW SHELL TRANSPARENT

BACKGROUND OF THE INVENTION

This invention relates to a method of displaying a three-dimensional object for use in a computer aided design (CAD).

Various three-dimensional display systems are conventionally put to practical use. For example, U.S. Pat. No. 5,157,546 discloses a technique for observing a three-dimensional display in which the observer is positioned at the interior of the three-dimensional display on a disk, which is obliquely mounted on a rotating shaft to rotate around the rotating shaft or a hollow and transparent cylinder, and observes the display looking outwardly therefrom.

However, the above-mentioned prior art has the disadvantages that it is impossible to simultaneously display both the outside and the inside of a three-dimensional object and to display the three-dimensional object without complicated operations so that the observer intuitively recognizes the display.

SUMMARY OF THE INVENTION

It is therefore an object of the present invention to provide a three-dimensional display method, a three-dimensional display system, and a recording medium for recording a three-dimensional display program, each of which is capable of simultaneously displaying both the outside and the inside of a three-dimensional object.

It is another object of the present invention to provide a three-dimensional display method, a three-dimensional display system, and a recording medium for recording a three-dimensional display program, each of which is capable of displaying the three-dimensional object without complicated operations so that the observer intuitively recognizes the display.

Other objects of this invention will become clear as the description proceeds.

According to an aspect of this invention, a method is for displaying a three-dimensional object having a hollow shell and comprising at least one internal object inside the hollow shell. The method comprises the steps of extracting, as an extracted shell part, a part of the hollow shell that is opposed to an observing point which lies outside the three-dimensional object and of displaying the three-dimensional object so as to see the inside of the three-dimensional object through the extracted shell part.

According to another aspect of this invention, a method is for displaying a three-dimensional object having a hollow shell and comprising at least one internal object inside the hollow shell. The method comprises the steps of extracting, as an extracted shell part, a part of the hollow shell that is opposed to an observing point which lies outside of the three-dimensional object and of displaying the three-dimensional object so as to make the extracted shell part transparent.

According to still another aspect of this invention, a recording medium is for recording a three-dimensional display program which makes a computer execute a processing of displaying a three-dimensional object having a hollow shell and comprising at least one internal object inside the hollow shell. The recording medium records the three-dimensional display program which makes the computer execute the processing of extracting, as an extracted shell part, a part of the hollow shell that is opposed to an observing point which lies outside of the three-dimensional object and of displaying the three-dimensional object so as to see the inside of the three-dimensional object through the extracted shell part.

According to yet another aspect of this invention, a recording medium is for recording a three-dimensional display program which makes a computer execute a processing of displaying a three-dimensional object having a hollow shell and comprising at least one internal object inside the hollow shell. The recording medium records the three-dimensional display program which makes the computer execute the processing of extracting, as an extracted shell part, a part of the hollow shell that is opposed to an observing point which lies in the outside of the three-dimensional object and of displaying the three-dimensional object so as to make the extracted shell part transparent.

According to a further aspect of this invention, a three-dimensional display system is for displaying a three-dimensional object having a hollow shell and comprising at least one internal object inside the hollow shell. The three-dimensional display system comprises extracting means for extracting, as an extracted shell part, a part of the hollow shell that is opposed to an observing point which lies in the outside of the three-dimensional object. Connected to the extracting means, displaying means is for displaying the three-dimensional object so as to see the inside of the three-dimensional object through the extracted shell part.

According to a still further aspect of this invention, a three-dimensional display system is for displaying a three-dimensional object having a hollow shell and comprising at least one internal object inside the hollow shell. The three-dimensional display system comprises extracting means for extracting, as an extracted shell part, a part of the hollow shell that is opposed to an observing point which lies outside of the three-dimensional object. Connected to the extracting means, displaying means is for displaying the three-dimensional object so as to make the extracted shell part transparent.

DESCRIPTION OF THE PREFERRED EMBODIMENTS

Figure 1:
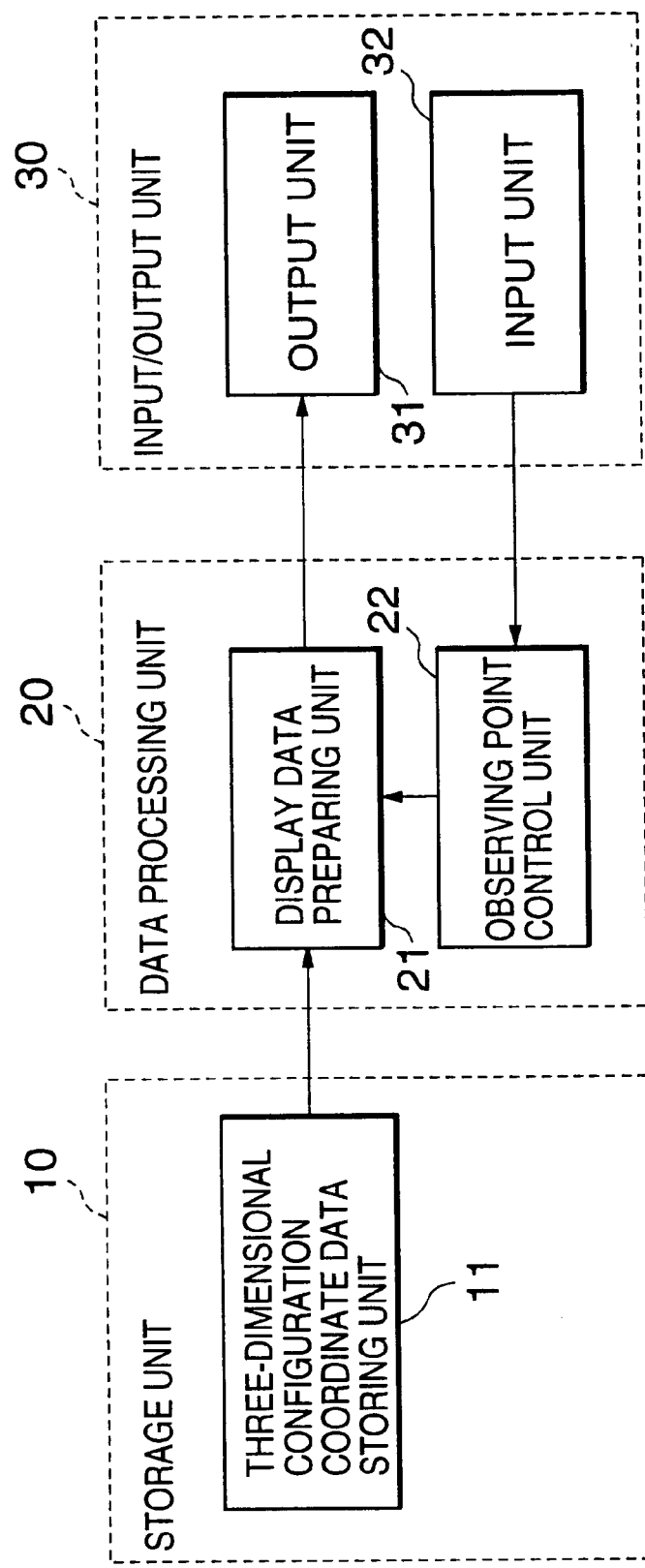
FIG. 1 is a block diagram showing a three-dimensional display system according to a first embodiment of the present invention.

Referring to FIG. 1, the description will proceed to a three-dimensional display system according to a first embodiment of this invention. The illustrated three-dimensional display system comprises a storage unit 10 for storing data and for producing the data, a data processing unit 20 being operable in accordance with a program control, and an input/output unit 30 for inputting and outputting data from and to the outside.

The storage unit 10 comprises a three-dimensional configuration coordinate data storing unit 11. The data processing unit 20 comprises a display data preparing unit 21 connected to the three-dimensional configuration coordinate data storing unit 11 and an observing point (viewpoint) control unit 22 connected to the display data preparing unit 20. The input/output unit 30 comprises an output unit 31 such as a display device or the like and an input unit 32 such as a mouse or the like. The output unit 31 is connected to the display data preparing unit 21 while the input unit 32 is connected to the observing point control unit 32.

A rough description about the above-mentioned units is given below. The three-dimensional configuration coordinate data storing unit 11 stores three-dimensional coordinate data concerning a three-dimensional object of displayed object. The three-dimensional object has a hollow shell and comprises at least one internal object inside the hollow shell. The observing point control unit 22 supplies the display data preparing unit 21 with an observing point position datum indicative of an observing point position. The display data preparing unit 21 reads the three-dimensional coordinate data concerning the three-dimensional object out of the three-dimensional configuration coordinate data storing unit 11 and then configures or prepares, with reference to the observing point position datum supplied from the observing point control unit 22, display data so as to make a particular part in the hollow shell transparent wherein the particular part has an outside surface opposed to an observing point, and produces the display data which is supplied to the output unit 31. Supplied with the display data, the output unit 31 displays the display data on a display screen of the display device or the like.

It is assumed that a position change request for the observing point is displayed on the display screen by an input operation using a mouse or the like. In this event, the input unit 32 detects the position change request to deliver the position change request to the observing point control unit 22. Responsive to the position change request, the observing point control unit 22 changes the observing point position which the observing point control unit 22 controls. The observing point control unit 22 supplies the observing point position datum indicative of the observing point position. Responsive to the observing point position datum, the display data preparing unit 20 determines a part in the hollow shell which should be transparent again and produces renewed display data which is supplied to the output unit 31.

At any rate, a combination of the input unit 32 and the observing point control unit 22 serves as an observing point position designating arrangement for designating the observing point position. A combination of the display data preparing unit 21 and the output unit 31 acts as a display control arrangement for reading the three-dimensional coordinate data from the storage unit 10, converting, in accordance with the observing point position, the three-dimensional coordinate data into display data where a particular shell part of the hollow shell is made transparent, the particular shell part being opposed to the observing point position, and displaying the display data on the display screen thereof.

Referring now to FIG. 3, description will proceed to operation of the three-dimensional display system illustrated in FIG. 1.

First, the display data preparing unit 21 reads the coordinate data (three-dimensional coordinate) for the displayed object out of the three-dimensional configuration coordinate data storing unit 11 at a first step S1. The first step S1 is followed by a second step S2 at which the display data preparing unit 21 refers to the observing point control unit 21 to obtain the newest observing point position datum from the observing point control unit 21. The second step S2 proceeds to a third step S3 at which the display data preparing unit 20 extracts, on the basis of the coordinate data and the observing point position datum, a particular shell part of the hollow shell that has an outside surface opposed to the observing point in order to determine that which part in the displayed object should be transparent. The third step S3 is succeeded by a fourth step S4 at which the display data preparing unit 21 prepares or configures display data where the extracted particular shell part is made transparent to produce the display data which is supplied to the output unit 31. The fourth step S4 is followed by a fifth step S5 at which the output unit 31 displays the display data on the display screen of the display device.

The fifth step S5 proceeds to a sixth step S6 at which the display data preparing unit 21 is put into a wait state until the observing point position data is renewed by the observing point control unit 22. The sixth step S6 is succeeded by a seventh step S7 at which the input unit 32 determines whether or not the observing point position is renewed. It will be presumed that the observing point change request occurs in the input unit 32 by the input operation using a mouse or the like. In this event, the seventh step S7 is followed by an eighth step S8 at which the input unit 32 delivers the observing point position change request to the observing point control unit 22. The eighth step S8 proceeds to a ninth step S9 at which the observing point control unit 22 changes the observing point position in response to the observing point position change request. Thereafter, operations in the second through the ninth steps S2 to S9 are repeated to redisplay the display data in response to the renewed observing point position data.

Figure 2:
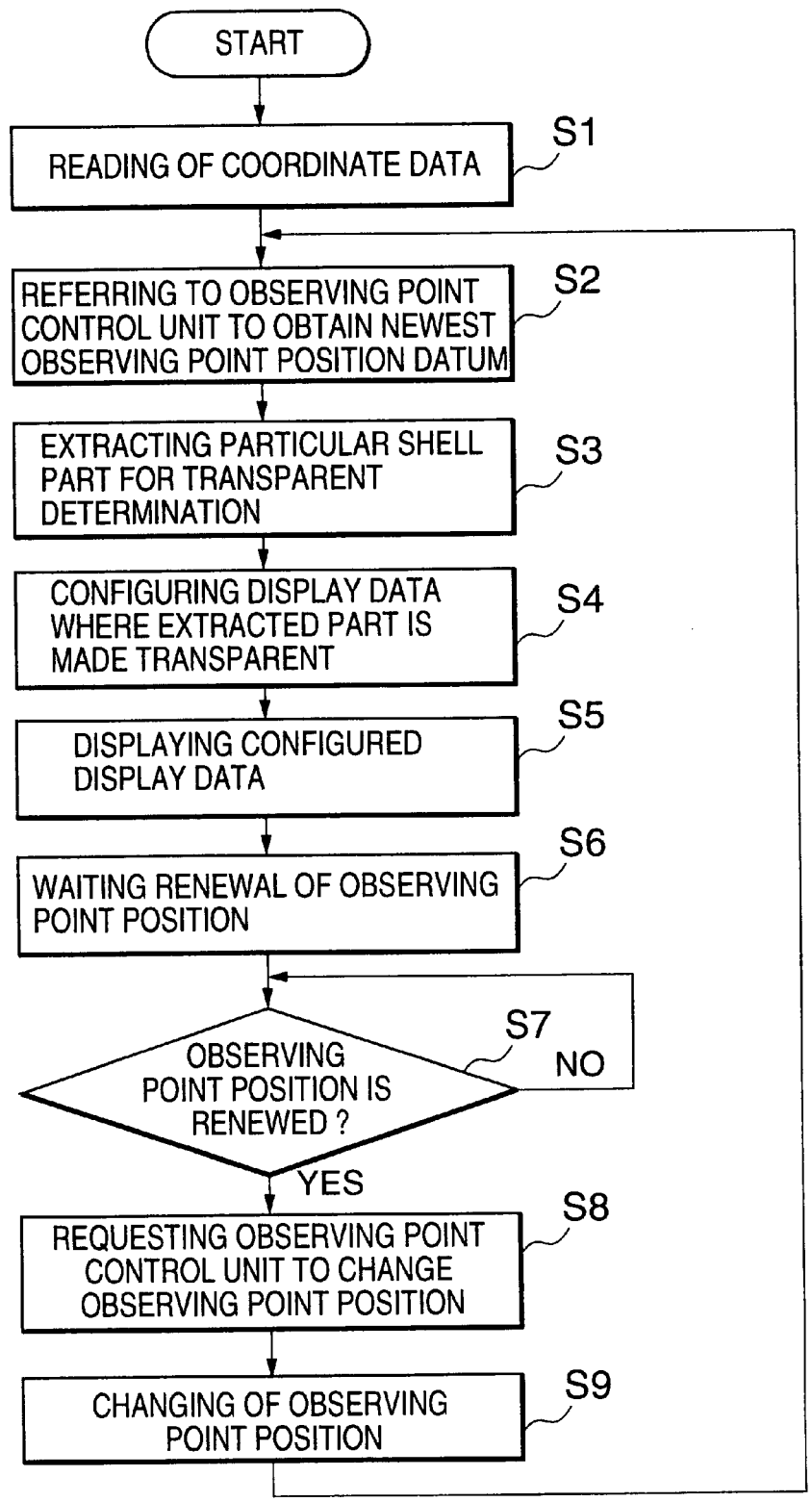
FIG. 2 is a flow chart for use in describing operation of the three-dimensional display system illustrated in FIG. 1.
Figure 3A:
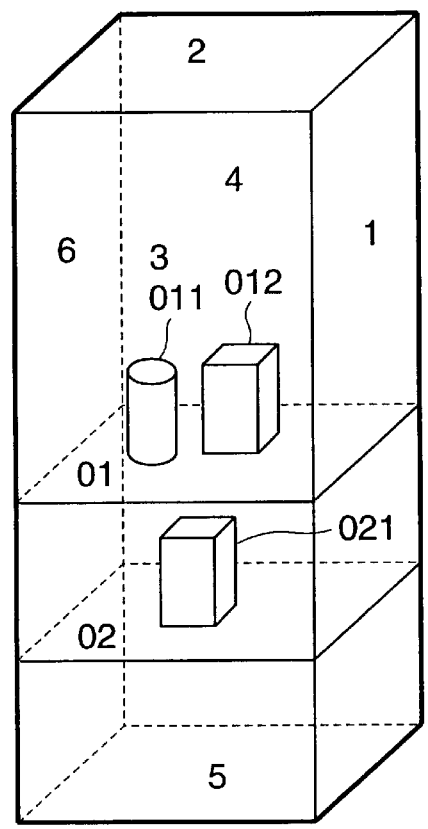
FIGS. 3A, 3B, and 3C are views for use in describing a concrete operation of the three-dimensional display system illustrated in FIG. 1.
Figure 3B:
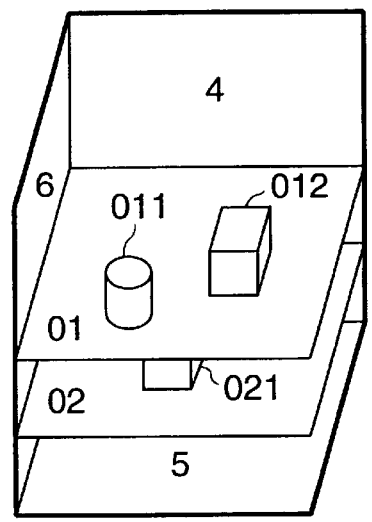
Figure 3C:
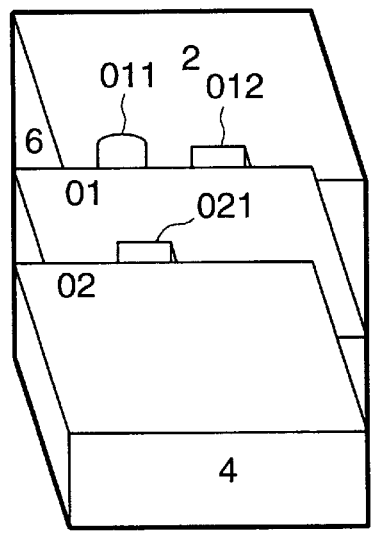

Referring now to FIGS. 3A, 3B, and 3C in addition to FIG. 2, description will proceed to a concrete operation of the three-dimensional display system illustrated in FIG. 1. FIG. 3A illustrates an example of structure of a building as the three-dimensional object. The illustrated building is a hollow rectangular parallelepiped in shape and comprises various displayed objects (internal objects) arranged on floors inside the building. The rectangular parallelepiped has an entire wall or shell which is divided into six shell parts: a right-hand side shell part, a top shell part, a front shell part, a rear shell part, a bottom shell part, and a left-hand side shell part which are depicted at reference numerals of 1, 2, 3, 4, 5, and 6, respectively. Each of the shell parts 1 to 6 has an outside surface and an inside surface. In addition, the building comprises upper and lower floors or planes which are disposed within the rectangular parallelepiped and which are depicted at reference numerals of 01 and 02, respectively. Furthermore, the building comprises first and second displayed objects located on the upper floor 01 and third displayed object located on the lower floor 02. The first through the third displayed objects (internal objects) are depicted at reference numerals of 011, 012, and 021, respectively.

The three-dimensional configuration coordinate data storing unit 11 stores coordinate data concerning the right-hand side shell part 1, the top shell part 2, the front shell part 3, the rear shell part 4, the bottom shell part 5, the left-hand side shell part 6, the upper floor 01, the lower floor 02, and the first through the third displayed objects 011, 012, and 021.

First, the display data preparing unit 21 reads the coordinate data concerning to the above-mentioned shell parts 1 to 6 and the above-mentioned floors 01 and 02 and the coordinate data concerning to the first through the third displayed objects 011, 012, and 021 out of the three-dimensional configuration coordinate data storing unit 11 at the first step S1 in FIG. 2.

Subsequently, the display data preparing unit 21 refers to the observing point control unit 22 to obtain the newest observing point position datum (the second step S2 in FIG. 2). In the example being illustrated, it will be assumed that the observing point is positioned oblique upward the building. The display data preparing unit 21 extracts, as particular shell parts, the right-hand side shell part 1, the top shell part 2, and the front shell part 3 whose outside surfaces are opposed to the observing point in order to determine, on the basis of the coordinate data concerning the three-dimensional object and the observing point position data, which parts of the shell parts should be transparent (the third step S3 in FIG. 2). Subsequently, the display data preparing unit 21 prepares or configures the display data where the extracted particular shell parts 1, 2, and 3 are made transparent (the fourth step S4 in FIG. 2). Subsequently, the display data preparing unit 21 delivers the prepared display data to the output unit 31 (the fifth step S5 in FIG. 2), thereby the output unit 31 displays the display date on the display screen thereof as illustrated in FIG. 3B.

The display data preparing unit 21 is put into the wait state until the observing point data is renewed by the observing point control unit 22 (the sixth step S6 in FIG. 2). It will be presumed that the input unit 32 detects, in response to the input operation using the mouse or the like, the observing point change request where the observing point position is changed downward. In this event, the input unit 32 delivers the observing point change request to the observing point control unit 22 (the eighth step S8 in FIG. 2). Responsive to the observing point change request, the observing point control unit 22 changes the controlled observing point position to a position located toward downward therefrom (the ninth step S9 in FIG. 2). Inasmuch as the observing point position datum is renewed in the observing point control unit 22, the display data preparing unit 20 carried out processing for redisplay in accordance with a new observing point position datum. For this purpose, the display data preparing unit 21 refers to the observing point control unit 22 to obtain the new observing point position indicated by the newest observing point position datum (the second step S2 in FIG. 2). In the example being illustrated, the observing point is positioned oblique downward the building.

The display date preparing unit 21 extracts, on the basis of the coordinate data concerning the three-dimensional object and the observing point position datum, the right-hand side shell part 1, the front shell part 3, and the bottom shell part 5 whose outside surfaces are opposed to the newest observing point (the third step S3 in FIG. 2). The display data preparing unit 21 prepares or configures the display data where the extracted shell parts 1, 3, and 5 are made transparent (the fourth step S4 in FIG. 2). The display data preparing unit 21 delivers the prepared display data to the output unit 31 (the fifth step S5 in FIG. 2), thereby the output unit 31 displays the display data on the display screen thereof as illustrated in FIG. 3C. The above-mentioned operations are repeated whenever the observing point is changed or shifted.

As described above in conjunction with FIGS. 3A through 3C, according to this invention, as regards the shell constituting the three-dimensional object, when ones of the shell parts are visible from the observing point position, the above-mentioned ones of the shell parts are made transparent. Other of the shell parts are not made transparent from the inside. As a result, it is possible to refer to the inside of the three-dimensional object. In addition, in a case where other internal objects are arranged inside the three-dimensional object, the other internal objects are not made transparent in a manner as the other internal objects are normally visible.

In the manner which is described above, it is possible to simultaneously display both of the outside appearance and the inside of the three-dimensional object and to display the three-dimensional object without any complicated operations so that the observer intuitively recognizes the display.

In addition, the three-dimensional display system according to the first embodiment of this invention is advantageous in that it is possible to use existing three-dimensional shape data as it is. This is because operation for making only necessary parts of the face transparent is not required additional data to the original three-dimensional shape data.

Furthermore, according to the first embodiment of this invention, it is possible to paste pattern date on the inside of the faces. In this event, it is possible to simply apply the three-dimensional display system according to the first embodiment of this invention to existing virtual three-dimensional display system. This is because the outside pattern data may be simply removed in the three-dimensional display system which realizes structure so that a viewing way from the outside is transparent.

In addition, according to this invention, it is possible to move or shift the observing point to the inside enclosed with a wall and to express the three-dimensional object just like one exists oneself therein. This is because the pattern of the inside wall seen from the inside is displayed.

Figure 4:
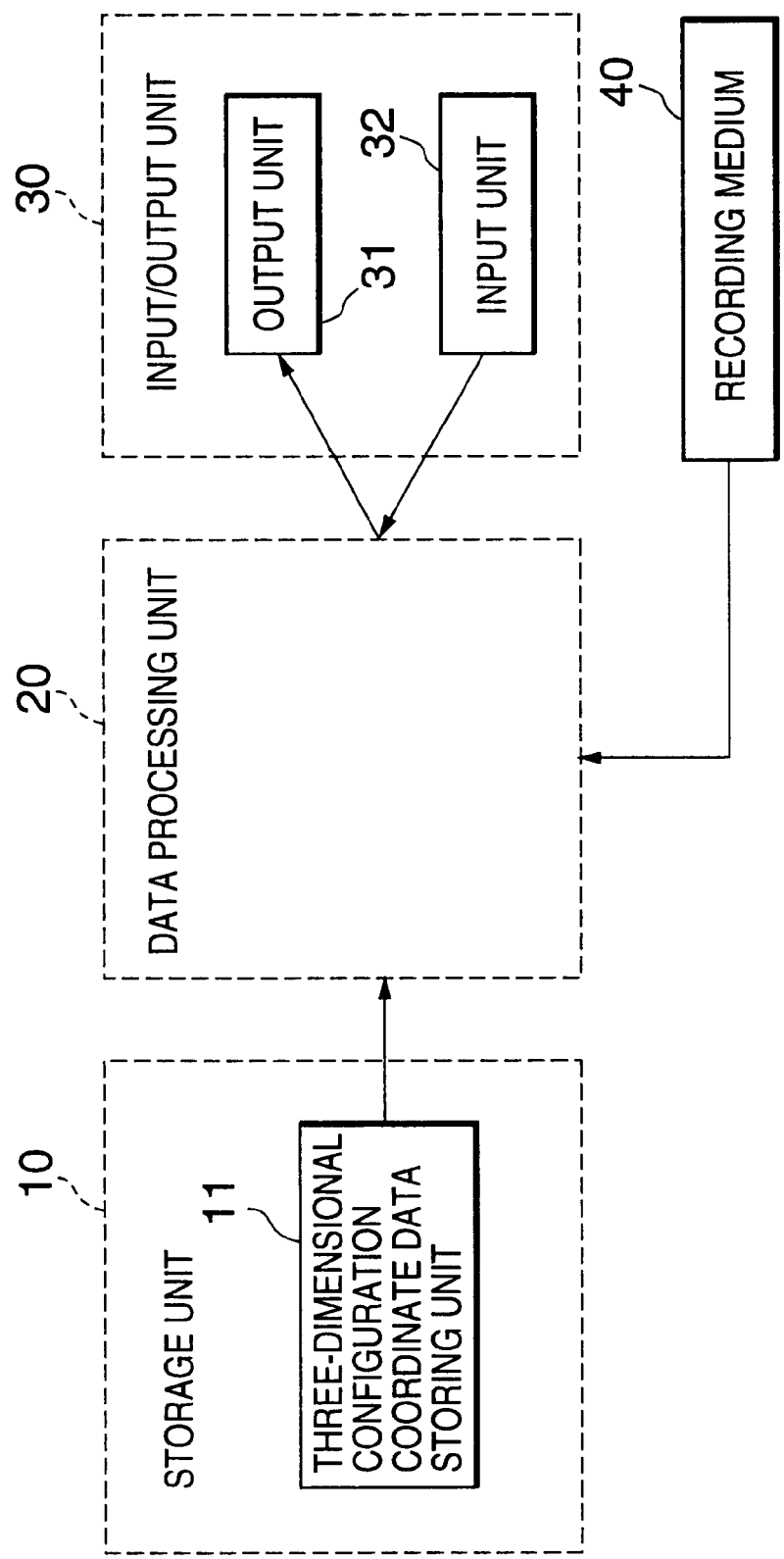
FIG. 4 is a block diagram showing a three-dimensional display system according to a second embodiment of the present invention.

Referring to FIG. 4, description will proceed to a three-dimensional display system according to a second embodiment of this invention. The illustrated three-dimensional display system is similar in structure to that illustrated in FIG. 1 except that the three-dimensional display system further comprises a recording medium 40.

The recording medium 40 records a three-dimensional inside visible program as will later become clear. The recording medium 40 may be a magnetic disk, a semiconductor memory, and other memorizing mediums. The three-dimensional inside visible program is a program which is identical with that illustrated in FIG. 2 and which makes the data processing unit 20 execute the program illustrated in FIG. 2.

The three-dimensional inside visible program is read from the recording medium 40 to the data processing unit 20 to control operation of the data processing unit 20. Under the control of the three-dimensional inside visible program, the data processing unit 20 executes a processing which is identical with that by the data processing unit 20 illustrated in FIG. 1.

Figure 5:
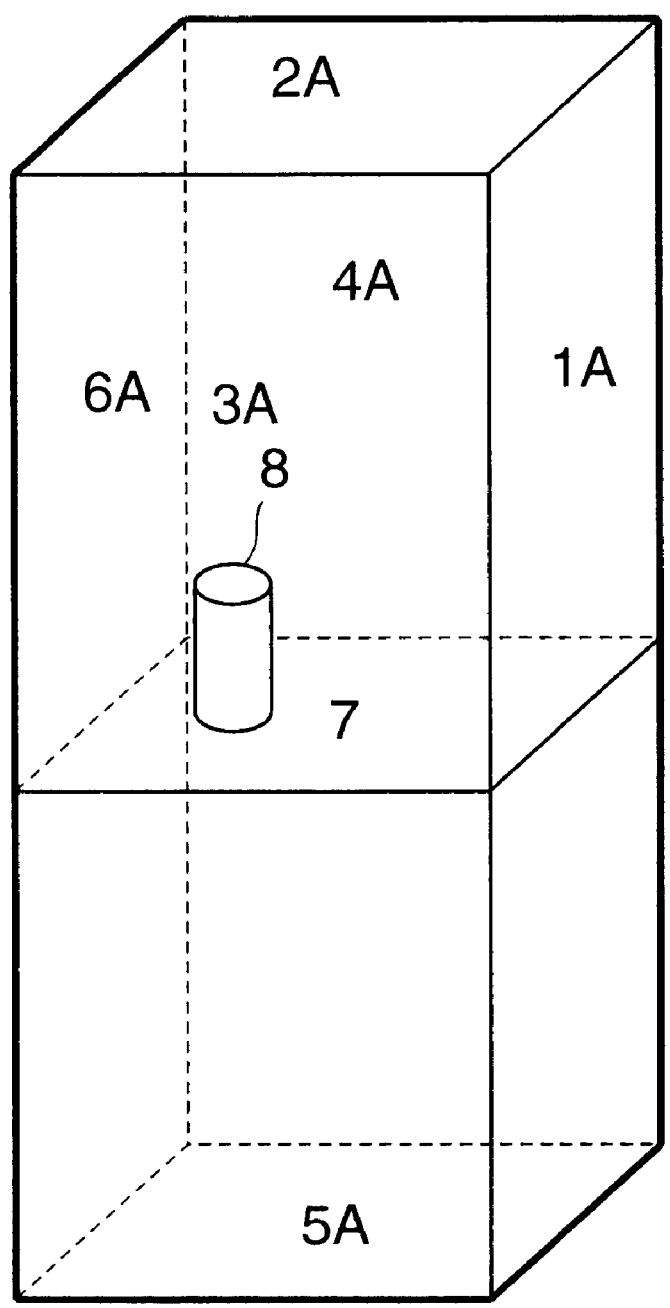
FIG. 5 shows another example of coordinate data stored in a three-dimensional configuration coordinate data storing unit for use in the three-dimensional display system illustrated in FIG. 1.

Turning to FIG. 5, description will proceed to another example of coordinate data stored in the three-dimensional configuration coordinate data storing unit 11 illustrated in FIG. 1. The illustrated three-dimensional object is a hollow rectangular parallelepiped in shape. The hollow rectangular parallelepiped has an entire closed outer wall or shell which is divided into six shell parts: a right-hand side shell part 1A, a top shell part 2A, a front shell part 3A, a rear shell part 4A, a bottom shell part 5A, and a left-hand side shell part 6A. Each of the shell parts 1A to 6A consists of a plate having different permeability in a different direction such as a magic mirror. That is, each of shell parts 1A to 6A is made of a material which is visible transparent such as transparent glass when one sees from one side and which is visible its surface without transparent when one sees from opposite side.

In the example being illustrated, each of the shell parts is arranged so that the inside is seen through the shell part on seeing from the outside and the outside is not seen through the shell part on seeing from the inside. In other words, it is possible to see the inside enclosed with the entire closed shell and an internal surface of the entire closed shell through each shell part on seeing from the outside at any angle.

The three-dimensional object comprises an inner wall or floor 7 and an internal object 8 located on the floor 7. The floor 7 is parallel to the top shell part 2A and the bottom shell part 5A and is made of a normal nontransparent plate. The internal object 8 is also made of a normal nontransparent material.

In the manner which is described above, by using the plates each having directional permeability, it is possible to realize as a three-dimensional inside visible display system in real world.

Figure 6:
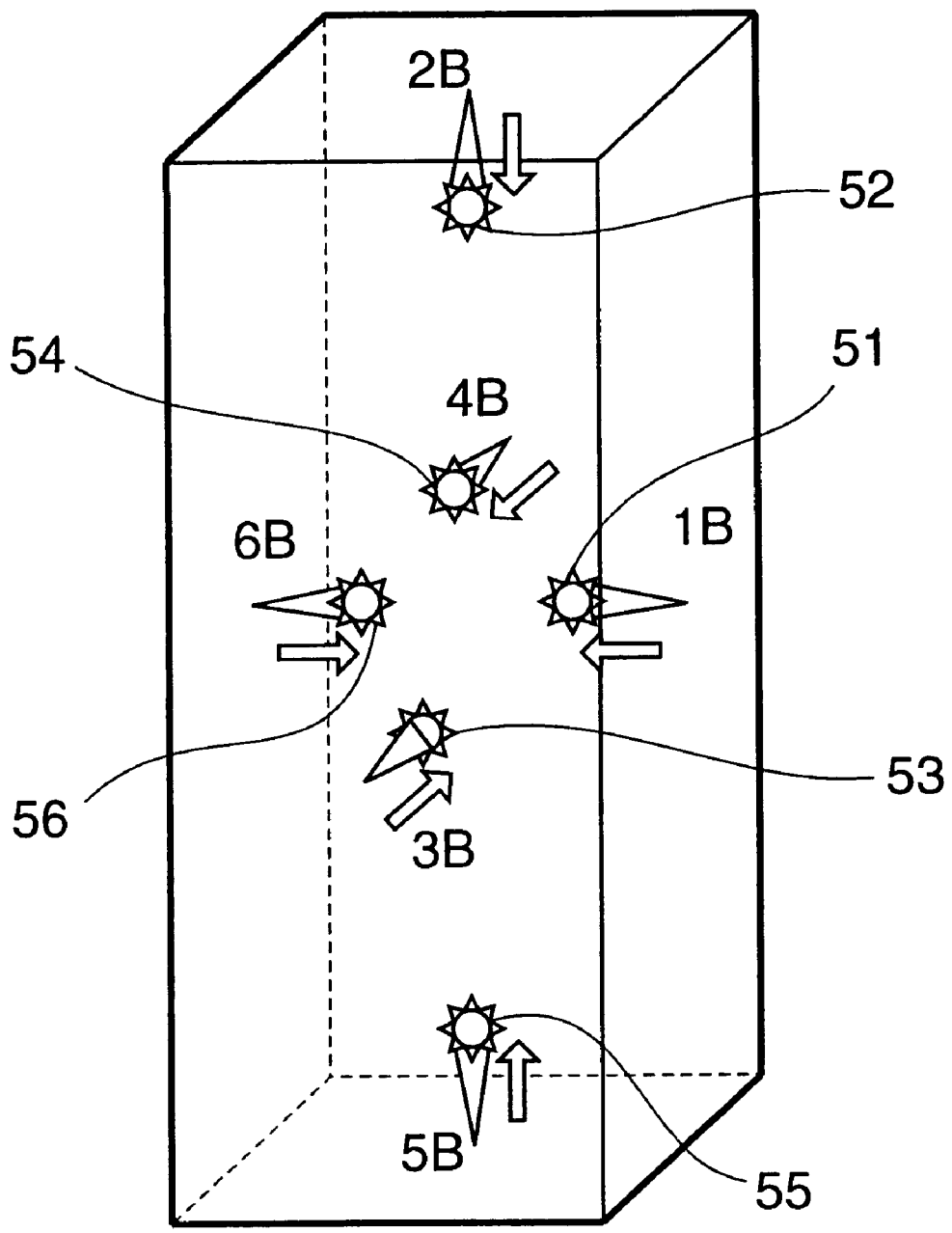
FIG. 6 shows still another example of coordinate data stored in a three-dimensional configuration coordinate data storing unit for use in the three-dimensional display system illustrated in FIG. 1.

Turning to FIG. 6, description will proceed to still another example of coordinate data stored in the three-dimensional configuration coordinate data storing unit 11 illustrated in FIG. 1. The illustrated three-dimensional object is also a hollow rectangular parallelepiped in shape. The hollow rectangular parallelepiped has an entire closed outer wall or shell which is divided into six shell parts: a right-hand side shell part 1B, a top shell part 2B, a front shell part 3B, a rear shell part 4B, a bottom shell part 5B, and a left-hand side shell part 6B. Each of the shell parts 1B to 6B consists of a semitransparent plate in lieu of the plate with directional permeability of each shell part as illustrated in FIG. 5.

When it is difficult to see the inside of the three-dimensional object because the inside is dark, illuminance may be risen up by illuminating the inside enclosed with the shell by means of a light source arrangement. In the example being illustrated, the light source arrangement consists of first through six light sources 51, 52, 53, 54, 55, and 56 which are disposed in the vicinity of the right-hand side shell part 1B, the top shell part 2B, the front shell part 3B, the rear shell part 4B, the bottom shell part 5B, and the left-hand side shell part 6B, respectively, as shown in FIG. 6. More specifically, the first light source 51 illuminates only an inside surface of the right-hand side shell part 1B, the second light source 52 illuminates only an inside surface of the top shell part 2B, the third light source 53 illuminates only an inside surface of the front shell part 3B, the fourth light source 54 illuminates only an inside surface of the rear shell part 4B, the fifth light source 55 illuminates only an inside surface of the bottom shell part 5B, and the sixth light source 56 illuminates only an inside surface of the left-hand side shell part 6B. Under the circumstances, the following method may be adopted. That is, the method comprises the step of detecting a observing point position by means of a sensor (not shown) or the like, of determining, as determined shell part or parts, the shell part or parts where only the inside is visible from the observing point position, and of illuminating only the determined shell part or parts by means of corresponding light source or sources.

It will be assumed that the observing point is located in an oblique upward position as illustrated in FIG. 6. Specifically, the right-hand side shell part 1B, the top shell part 2B, and the front shell part 3B are directly visible from the observing point. In this event, the first through the third light sources 51 to 53 are turned on while the fourth through the sixth light sources 54 to 56 are turned off.

In the manner which is described above, although the plates with directional permeability are not used, it is possible to realize as a three-dimensional inside visible display system in real world.

While this invention has thus far been described in conjunction with preferred embodiments thereof, it will now be readily possible for those skilled in the art to put this invention into various other manners.

What is claimed is:

1. A method of displaying a three-dimensional object having a hollow shell and comprising at least one internal object inside the hollow shell, said method comprising the steps of:

extracting, as an extracted shell part, a part of the hollow shell that is opposed to an observing point which lies in the outside of the three-dimensional object; and displaying the three-dimensional object so as to see the inside of the three-dimensional object through the extracted shell part.

2. A method of displaying a three-dimensional object having a hollow shell and comprising at least one internal object inside the hollow shell, said method comprising the steps of:

extracting, as an extracted shell part, a part of the hollow shell that is opposed to an observing point which lies in the outside of the three-dimensional object; and displaying the three-dimensional object so as to make the extracted shell part transparent.

3. A recording medium for recording a three-dimensional display program which makes a computer execute a processing of displaying a three-dimensional object having a hollow shell and comprising at least one internal object inside the hollow shell, said recording medium recording the three-dimensional display program which makes the computer execute the processing of:

extracting, as an extracted shell part, a part of the hollow shell that is opposed to an observing point which lies in the outside of the three-dimensional object; and displaying the three-dimensional object so as to see the inside of the three-dimensional object through the extracted shell part.

4. A recording medium for recording a three-dimensional display program which makes a computer execute a processing of displaying a three-dimensional object having a hollow shell and comprising at least one internal object inside the hollow shell, said recording medium recording the three-dimensional display program which makes the computer execute the processing of:

extracting, as an extracted shell part, a part of the hollow shell that is opposed to an observing point which lies in the outside of the three-dimensional object; and displaying the three-dimensional object so as to make the extracted shell part transparent.

5. A three-dimensional display system for displaying a three-dimensional object having a hollow shell and comprising at least one internal object inside the hollow shell, said three-dimensional display system comprising:

extracting means for extracting, as an extracted shell part, a part of the hollow shell that is opposed to an observing point which lies in the outside of the three-dimensional object; and displaying means, connected to said extracting means, for displaying the three-dimensional object so as to see the inside of the three-dimensional object through the extracted shell part.

6. A three-dimensional display system for displaying a three-dimensional object having a hollow shell and comprising at least one internal object inside the hollow shell, said three-dimensional display system comprising:

extracting means for extracting, as an extracted shell part, a part of the hollow shell that is opposed to an observing point which lies in the outside of the three-dimensional object; and displaying means, connected to said extracting means, for displaying the three-dimensional object so as to make the extracted shell part transparent.

7. A three-dimensional display system for displaying a three-dimensional object having a hollow shell and comprising at least one internal object inside the hollow shell, said three-dimensional display system comprising:

a storage unit for storing three-dimensional coordinate data indicative of the hollow shell and the at least one internal object;

observing point position designating means for designating an observing point position; and display control means, connected to said storage unit and said observing point position designating means, for reading the three-dimensional coordinate data from said storage unit and converting, in accordance with the observing point position, the three-dimensional coordinate data into display data where a particular shell part of the hollow shell is made transparent, the particular shell part being opposed to the observing point position, said display control means displaying the display data on a display screen thereof.

* * * * *

UNITED STATES PATENT AND TRADEMARK OFFICE
CERTIFICATE OF CORRECTION

PATENT NO. : 6,507,340 B1
DATED : January 14, 2003
INVENTOR(S) : Hiroshi Yamaguchi and Hiroshi Maruyama It is certified that error appears in the above-identified patent and that said Letters Patent is hereby corrected as shown below:

<u>Title page,</u>
Item [56[, References Cited, please insert the following information:

-- FOREIGN PATENT DOCUMENTS

JP 7-73338     March 17, 1995 --

Signed and Sealed this

Twenty-seventh Day of April, 2004

JON W. DUDAS
*Acting Director of the United States Patent and Trademark Office*